(12) United States Patent
Goddard

(10) Patent No.: US 9,371,058 B2
(45) Date of Patent: Jun. 21, 2016

(54) WIPER ASSEMBLY

(71) Applicant: Aaron Goddard, Iowa City, IA (US)

(72) Inventor: Aaron Goddard, Iowa City, IA (US)

(73) Assignee: Hagie Manufacturing Company, Clarion, IA (US)

( * ) Notice: Subject to any disclaimer, the term of this patent is extended or adjusted under 35 U.S.C. 154(b) by 304 days.

(21) Appl. No.: 14/069,866

(22) Filed: Nov. 1, 2013

(65) Prior Publication Data

US 2015/0121640 A1     May 7, 2015

(51) Int. Cl.
    *B60S 1/34*      (2006.01)
    *B60S 1/40*      (2006.01)

(52) U.S. Cl.
CPC ............. *B60S 1/3486* (2013.01); *B60S 1/3406* (2013.01); *B60S 1/3409* (2013.01); *B60S 1/40* (2013.01)

(58) Field of Classification Search
CPC ........ B60S 1/3486; B60S 1/3402; B60S 1/34; B60S 1/3404; B60S 1/3406; B60S 1/3409; B60S 1/40
USPC ............................ 15/250.21, 250.23, 250.351
See application file for complete search history.

(56) References Cited

U.S. PATENT DOCUMENTS

| | | | | |
|---|---|---|---|---|
| 1,533,944 A | * | 4/1925 | Prowense | B60S 1/3404 15/245 |
| 2,624,904 A | * | 1/1953 | Wianco | B60S 1/26 15/250.23 |
| 2,738,536 A | * | 3/1956 | Spencer, Jr. | B60S 1/3404 15/250.23 |
| 2,790,195 A | * | 4/1957 | Wrobel | B60S 1/3406 15/250.23 |
| 3,247,540 A | * | 4/1966 | Howard | B60S 1/3406 15/250.23 |
| 4,546,518 A | * | 10/1985 | Harbison | B60S 1/42 15/250.23 |
| 5,033,157 A | * | 7/1991 | von Meltzing | B60S 1/3404 15/250.21 |
| 5,502,866 A | * | 4/1996 | Battlogg | B60S 1/34 15/250.21 |
| 2007/0271722 A1 | * | 11/2007 | Powell | B60S 1/26 15/250.23 |

FOREIGN PATENT DOCUMENTS

| DE | 19709654 A1 | * | 9/1998 |
|---|---|---|---|
| DE | 19742071 C1 | * | 4/1999 |

* cited by examiner

*Primary Examiner* — Gary Graham
(74) *Attorney, Agent, or Firm* — Brett J. Trout

(57) ABSTRACT

A system for maintaining a wiper blade generally perpendicular to a curved windshield as the wiper moves throughout its stroke. A four bar linkage system is coupled to a first bevel gear causing it to drive a second bevel gear coupled to the wiper, thereby maintaining the wiper in a generally perpendicular orientation relative to the curved windshield. The windshield wiper system may be used as a single blade or may be used in tandem with blades running either independently or in a synchronized manner.

17 Claims, 5 Drawing Sheets

WIPER ASSEMBLY

TECHNICAL FIELD

The disclosed embodiments relate generally to a windshield wiper and, in particular, to a rotating windshield wiper.

BACKGROUND OF THE INVENTION

It is known in the art to provide windshield wipers connected by an arm to a power source. The windshield wipers may be connected to the arm in a manner that allows the windshield wiper to rotate relative to the arm, allowing the windshield wiper to clear a more desirable portion of the windshield of water and debris. The windshield wiper is typically provided with a resilient edge that contacts the windshield to remove water and debris. It is desirable to orient the edge of the windshield wiper at a predetermined attack angle relative to the windshield to most efficiently clean the windshield of water and debris.

One drawback associated with the prior art is the inability of windshield wipers to adequately clear curved windshields. Prior art windshields are set at a predetermined attack angle relative to the windshield. In curved windshield applications, the windshield wiper is not able to maintain the desired attack angle throughout the sweep of the wiper. Accordingly, the edge of the windshield wiper moves from an attack angle that is undesirably shallow through the desired attack angle, back to an attack angle that is undesirably shallow in the opposite direction.

It would be desirable to provide a windshield wiper system that allows the edge of the windshield wiper to maintain the desired attack angle throughout the sweep of the wiper across a curved windshield. The drawbacks associated with the prior art described hereinabove are substantially eliminated by the present invention.

SUMMARY OF THE DISCLOSED SUBJECT MATTER

The present invention includes a wiper assembly having a first arm and second arm pivotably coupled to a linkage. A connector is also pivotably coupled to the linkage. A first gear is coupled to the first arm. The wiper is pivotably coupled to the first arm. A second gear is coupled to the wiper in drivable connection with the first gear. As the first arm moves back and forth, the second arm pivots the connector, which causes the first gear to engage the second gear and rotate the wiper relative to the first arm.

The features and advantages described in this summary and in the following detailed description are not all-inclusive. Additional features and advantages may be apparent to one of ordinary skill in the art in view of the drawings, specification and claims presented herein.

BRIEF DESCRIPTION OF THE DRAWINGS

The present invention will now be described, by way of example, with reference to the accompanying drawings in which.

DETAILED DESCRIPTION OF THE DRAWINGS

Figure 1:
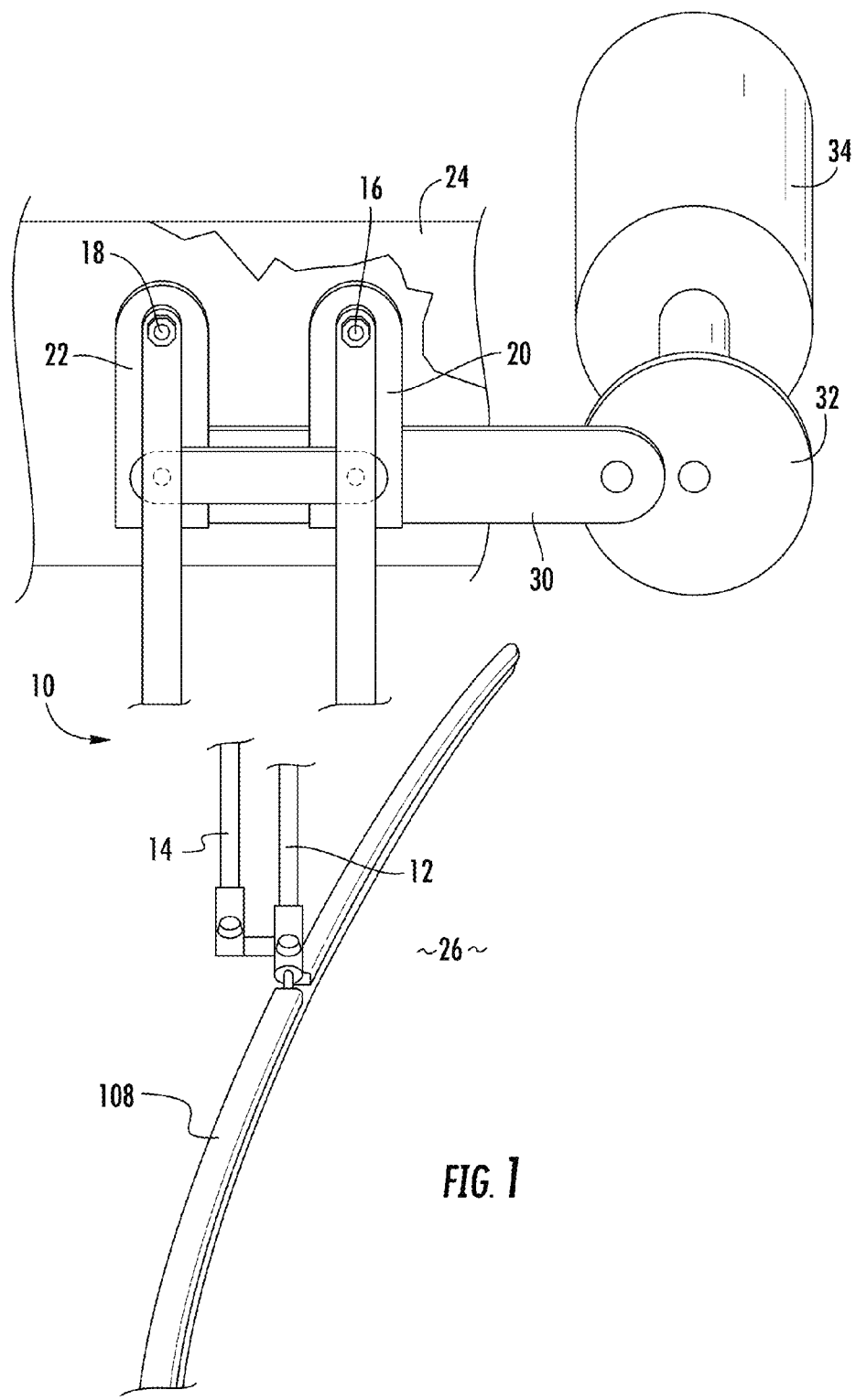
FIG. 1 illustrates a top perspective view in partial cut-away, of a wiper system in accordance with one embodiment.
Figure 2:
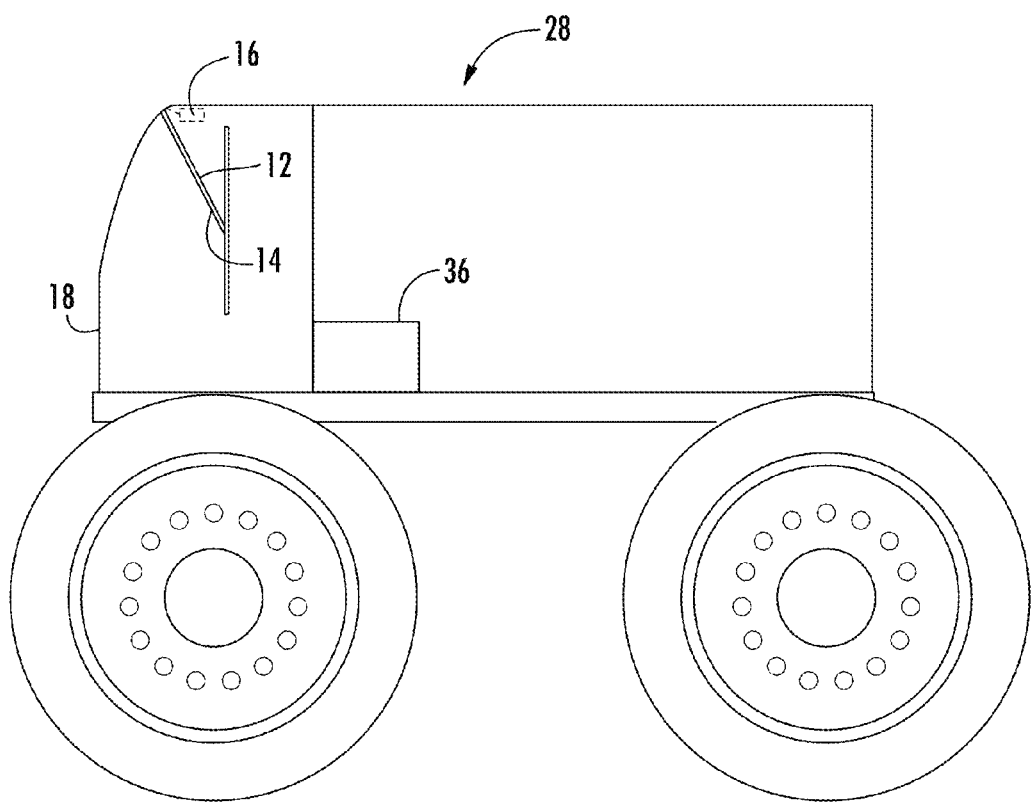
FIG. 2 illustrates a side elevation of an agricultural vehicle equipped with the wiper system in accordance with one embodiment.
Figure 3:
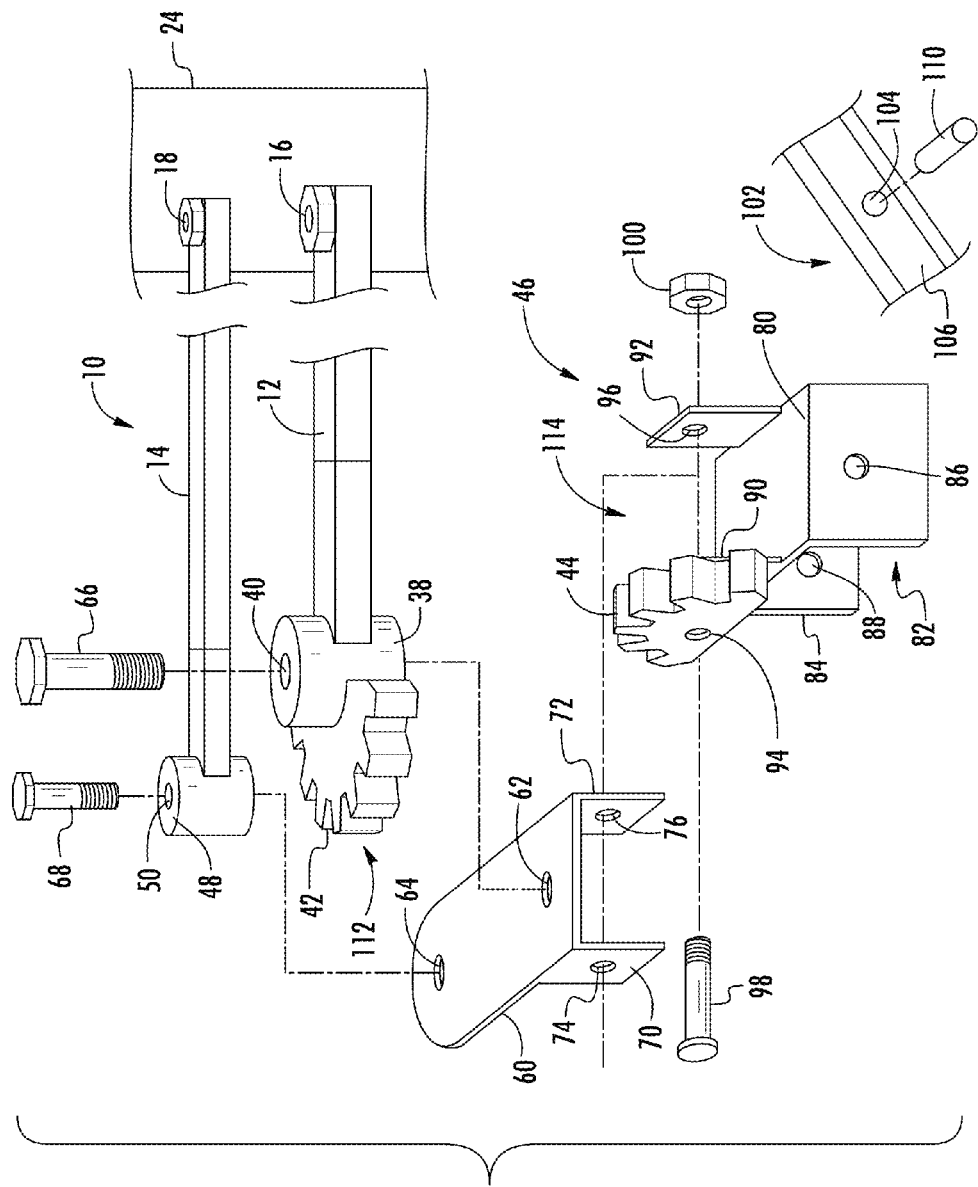
FIG. 3 illustrates an exploded view of the wiper system in accordance with one embodiment.

As shown in FIG. 1, a wiper system (10) is provided having a first arm (12) and a second arm (14). The first arm (12) and a second arm (14) are coupled by driveshafts (16) and (18), to levers, which are preferably steel plates (20) and (22) (FIGS. 1-3). The driveshafts (16) and (18) are journaled through a connector, which, in the preferred embodiment, is a steel bracket (24), but may, of course, be any type of structure coupling the first arm (12) to the second arm (14). The steel bracket (24) is provided above a curved windshield (26) of an agricultural vehicle (28). The first steel plate (20) coupled to the first driveshaft (16) is pivotably coupled to a reciprocating arm (30), which, in turn, is pivotably coupled to a steel drive wheel (32). The steel drive wheel (32) is coupled to an electric motor (34) in a manner that turns the drive wheel (32) and reciprocates the first arm (12) and second arm (14) back and forth across the windshield (26).

As shown in FIGS. 1-3, the motor (34) is pivotably secured above the windshield (26). It should be noted, however, that the motor (34) may be provided at the bottom, or along the sides, of the windshield (26). If desired, additional wiper assemblies (10) may be provided on a single windshield (26), and may be operated independently or in synchronicity with one another. The motor (34) is powered by a battery (36) provided on the agricultural vehicle (28). Alternatively, any known method for driving a windshield wiper may be employed to drive the first arm (12) of the wiper assembly (10).

As shown in FIG. 3, welded or otherwise secured to the end of the first arm (12) is a first steel sleeve (38) provided with a throughbore (40). Welded or otherwise secured to the steel sleeve (38) is a first gear (42), fitted into mating engagement with a second gear (44). As shown in FIG. 3, the second gear (44) is welded, or otherwise secured to a shoulder assembly (46). The gears are preferably steel bevel gears, such as those known in the art. Similarly, a second steel sleeve (48) provided with a throughbore (50) is welded or otherwise secured to the end of the second arm (14).

Figure 4:
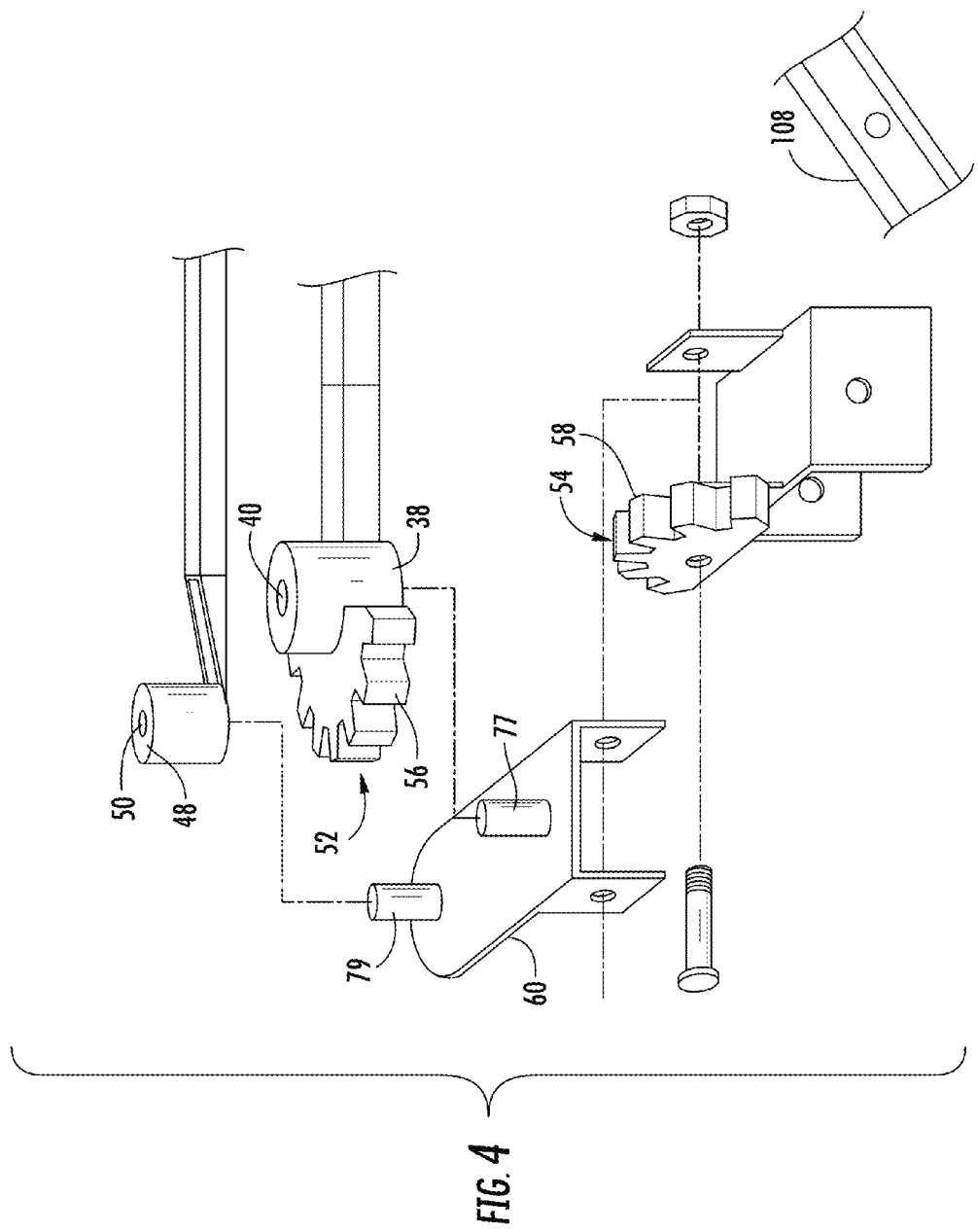
FIG. 4 illustrates a perspective view of an alternative embodiment of the gears of the present invention.

Shown in FIG. 4, is an alternative embodiment of the present invention using stamped, flat, steel gears (52) and (54), having tapered teeth (56) and (58), and integrally formed with the sleeve (24) and shoulder assembly (46). It will be appreciated that any assembly of gears capable of transferring rotational motion of the first arm (12) to the pivotal motion of the shoulder assembly (46) may be used.

In the preferred embodiment, a linkage (60) is pivotably coupled to the first arm (12) and second arm (14) (FIG. 3). The linkage (60) is provided with threaded bores (62) and (64). Shoulder bolts (66) and (68), such as those known in the art, are provided through the throughbores (40) and (50) of the first steel sleeve (38) and second steel sleeve (48) and threaded into engagement with the threaded bores (62) and (64) of the linkage (60). The linkage (60) is provided with two depending ears (70) and (72), each provided with a hole (74) and (76). Alternatively, as shown in FIG. 4, instead of shoulder bolts, two steel posts (77) and (79) may be welded to the linkage (60), provided through the throughbores (40) and (50)

of the first steel sleeve (38) and second steel sleeve (48), and journaled thereto by a ball and detent system, or any other journaling system known in the art.

As shown in FIG. 3, the shoulder assembly (46) is provided with a shoulder (80) constructed of steel, two downwardly facing flaps (82) and (84), each provided with a hole (86) and (88) and two upwardly facing flaps (90) and (92), each having a hole (94) and (96). The second gear (44) is welded or otherwise secured to the flap (90) of the shoulder assembly (46).

To assemble the windshield wiper system (10) of the present invention, the shoulder bolt (66) is inserted into the first steel sleeve (38) and threaded into the threaded bore (62). The shoulder bolt (68) is inserted into the second steel sleeve (48), and threaded into the threaded bore (64). The holes (74) and (76) of the ears (70) and (72) of the linkage (60) are aligned with the holes (94) and (96) of the flaps (90) and (92) of the shoulder assembly (46). A screw (98) is provided through the hole (94) in the flap (90) of the shoulder assembly (46), a hole (not shown) in the second bevel gear (44), and the hole (96) in the flap (92), of the shoulder assembly (46). The screw (98) is thereafter secured by a nut (100). The shoulder assembly (46) thereby rotates relative to the linkage (60), along, and axis coaxial with the screw (98).

As shown in FIGS. 1 and 3, a windshield wiper assembly (102) is provided with a throughbore (104). While the wiper assembly (102) has a superstructure (108) that may include claws such as those known in the art, in the preferred embodiment, the superstructure (108) is coupled to the wiper (106), which is a rubber blade. The shoulder assembly (46) is positioned over the wiper assembly (102), aligning the holes (86) and (88) with the throughbore (104). The shoulder assembly (46) is pivotably secured to the wiper assembly (102) by a detent pin (110) provided through holes (86) and (88) and throughbore (104).

Figure 5:
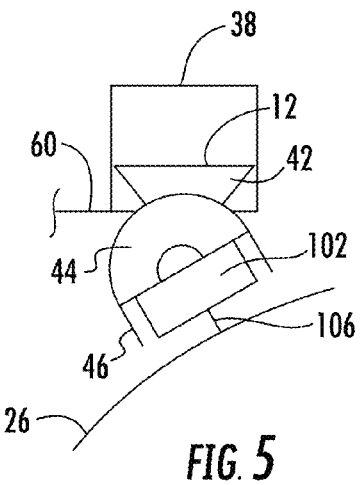
FIG. 5 illustrates a side elevation of the wiper system shown with the wiper at the far right of the stroke.

The first bevel gear (42) is provided with a first set of teeth (112) fitting into mating engagement with teeth (114) provided on the second bevel gear (44). The teeth (112) and (114) are engaged with one another in a manner such that as the first arm (12) is moved back and forth across the windshield (26) by the motor (34). The teeth (112) of the first bevel gear (42) engage the teeth (114) of the second bevel gear (44) to rotate the shoulder assembly (46) and wiper assembly (102) attached thereto to maintain the wiper assembly (102) at a generally right angle relative to the curved windshield (26). Although the wiper system (10) of the present invention maintains the wiper assembly (102) at a generally right angle relative to the curved windshield (26), as shown in FIGS. 5, 6 and 7, the resilient construction of the wiper (106) itself allows the wiper (106) to curl against the windshield (26) as the wiper assembly (102) moves back and forth across the windshield (26).

Accordingly, as the motor (34) moves the first arm (12) back and forth across the curved windshield (26), the pantographic orientation of the four-bar linkage formed by the first arm (12), second arm (14), linkage (60) and bracket (24), maintains the wiper assembly (102) in a generally vertical orientation as the system (10) moves the wiper assembly (102) back and forth across the curved windshield (26). Simultaneously, as shown in FIGS. 5, 6, and 7, when the first arm (12) is at the far left side of the curved windshield (26), when looking at the agricultural vehicle (28) from the front, the wiper assembly (102) is tilted inward relative to the first arm (12) to maintain the wiper assembly (102) in a predetermined orientation, in this case generally perpendicular, relative to the windshield (26), as shown in FIG. 5.

Figure 6:
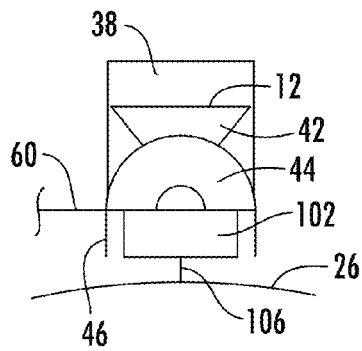
FIG. 6 illustrates a side elevation of the wiper system shown with the wiper in the middle of the stroke.
Figure 7:
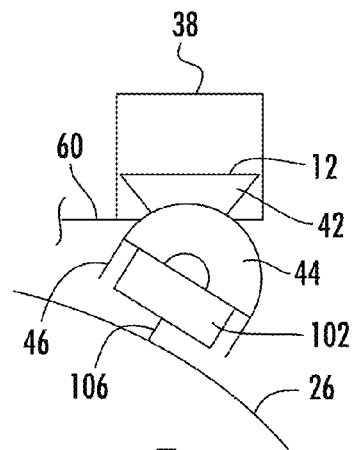
FIG. 7 illustrates a side elevation of the wiper system shown with the wiper at the far left of the stroke.

As the motor (34) moves the first arm (12) toward the center of the curved windshield (26), as shown in FIG. 6, the first bevel gear (42) rotates the second bevel gear (44) to maintain the wiper assembly (102) in a predetermined orientation, again in this case generally perpendicular, relative to the windshield (26). As the motor (34) moves the first arm (12) to the right side of the curved windshield (26), the first bevel gear (42) rotates the second bevel gear (44) to maintain the wiper assembly (102) in a predetermined orientation, once again preferably generally perpendicular, relative to the windshield (26). (FIG. 7). This movement of the first bevel gear (42) rotating the second bevel gear (44) to maintain the predetermined, and preferably perpendicular, orientation of the wiper assembly (102) relative to the curved windshield (26) continues as the wiper assembly (102) moves back and forth across the curved windshield (26).

Although the invention has been described with respect to a preferred embodiment thereof, it is to be understood that it is not to be so limited since changes and modifications can be made therein which are within the full, intended scope of this invention as defined by the appended claims. For instance, the system (10) may be constructed to maintain the wiper assembly (102) in a predetermined orientation relative to the windshield (26) that is not perpendicular, or may be constructed to rotate the wiper assembly (102) through various predetermined orientations as the motor (34) moves the first arm (12) relative to the windshield (26).

What is claimed is:

1. A wiper assembly comprising:
   (a) a connector;
   (b) a first arm coupled to the connector;
   (c) a second arm coupled to the connector;
   (d) a linkage pivotably coupled between the first arm and the second arm;
   (e) a first gear rigidly coupled to the first arm;
   (f) a wiper pivotably coupled to the first arm;
   (g) a shoulder assembly coupled to the wiper;
   (h) a second gear coupled to the wiper, wherein the second gear is rigidly coupled to the shoulder assembly; and
   (i) wherein the first gear is engaged to the second gear.

2. The wiper assembly of claim 1, wherein the connector, the first arm, the second arm and the linkage form a four bar linkage.

3. The wiper assembly of claim 1, further comprising a sleeve provided on the first arm and a shoulder bolt provided on the linkage, wherein the shoulder bolt is provided at least partially within the sleeve.

4. A wiper assembly comprising:
   (a) a connector;
   (b) a first arm coupled to the connector;
   (c) a second arm coupled to the connector;
   (d) a linkage pivotably coupled between the first arm and the second arm;
   (e) a first shoulder bolt coupled to the linkage;
   (f) a second shoulder bolt coupled to the linkage;
   (g) wherein the first shoulder bolt is journaled to the first arm;
   (h) wherein the second shoulder bolt is journaled to the second arm;
   (i) a first gear coupled to the first arm;
   (j) a wiper pivotably coupled to the first arm;
   (k) a second gear coupled to the wiper; and
   (l) wherein the first gear is engaged to the second gear.

5. The wiper assembly of claim 4, wherein the linkage is pivotably coupled to a shoulder assembly and wherein the shoulder assembly is pivotably coupled to the wiper.

6. A wiper assembly comprising:
(a) a connector;
(b) a first arm coupled to the connector;
(c) a second arm coupled to the connector;
(d) a linkage pivotably coupled between the first arm and the second arm;
(e) a first bevel gear coupled to the first arm;
(f) a wiper pivotably coupled to the first arm;
(g) a second bevel gear coupled to the wiper; and
(h) wherein the first sear is engaged to the second gear.

7. The wiper assembly of claim 6, wherein the second bevel gear is coupled to a shoulder, pivotably coupled to the wiper.

8. The wiper assembly of claim 7, wherein the linkage, the first arm, the second arm and the connector form a four-bar linkage.

9. A wiper assembly comprising:
(a) a linkage;
(b) a first arm pivotably coupled to the linkage;
(c) a second arm pivotably coupled to the linkage;
(d) a connector pivotably coupled to the first arm and the second arm;
(e) a shoulder pivotably coupled to the linkage;
(f) a wiper pivotably coupled to the shoulder in a manner that allows the wiper to pivot relative to the linkage along a first degree of freedom and a second degree of freedom;
(g) a first gear coupled to the first arm;
(h) a second gear coupled to the wiper; and
(i) wherein the first gear is coupled to the second gear.

10. The wiper assembly of claim 9, wherein the first degree of freedom is generally orthogonal to the second degree of freedom.

11. The wiper assembly of claim 9, wherein the first arm is generally parallel to the second arm.

12. The wiper assembly of claim 9, wherein the first gear is rigidly coupled to the first arm.

13. The wiper assembly of claim 12, wherein the second gear is pivotably coupled to the wiper.

14. The wiper assembly of claim 9, wherein the linkage, the first arm, the second arm and the connector form a four bar linkage.

15. The wiper assembly of claim 9, wherein the first gear and the second gear are bevel gears.

16. A wiper assembly comprising:
(a) a four bar parallel linkage comprising:
 (i) a linkage;
 (ii) a first arm pivotably coupled to the linkage;
 (iii) a second arm pivotably coupled to the linkage; and
 (iv) a connector pivotably coupled to the first arm and the second arm;
(b) a first gear coupled to the first arm;
(c) a second gear drivably coupled to the first gear;
(d) a shoulder coupled to the second gear; and
(e) a wiper coupled to the shoulder.

17. The wiper assembly of claim 16, wherein the first gear and the second gear are bevel gears.

* * * * *